Patented Oct. 14, 1930

1,778,709

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS OF TREATING RUBBER AND PRODUCT OBTAINED THEREBY

No Drawing. Application filed March 2, 1928. Serial No. 258,679.

This invention relates to the treatment of rubber and similar materials and to the products obtained thereby. The invention is more particularly concerned with new classes of chemical compounds capable of functioning as accelerators of vulcanization.

This case is a division of copending application Serial No. 258,670, and Serial No. 258,675, filed of even date.

Accordingly the objects of the invention include the vulcanization of rubber treated with the hereinafter described classes of compounds. Another object is to provide new chemical compounds, particularly useful in vulcanization, which are comparatively inexpensive and at the same time highly efficient both from the standpoint of their behavior during the compounding of rubber as well as in the properties which they impart to the vulcanized product. Another object of the invention is to accelerate the action of the new chemical compounds by the addition of base or to retard their action by the addition of acid material. A further object of the invention is to provide a method whereby the acid or base or the new compounds themselves may be introduced into rubber.

In the present practice of the use of accelerators, it is generally known that many of the compounds employed are so powerful that they cause a prevulcanization, or burning on the mixing mill. This serious disadvantage is possessed by many of the accelerators which have the property of vulcanizing rubber at ordinary temperatures or at temperatures well below those ordinarily employed in hot vulcanization, for example at 212° F. or thereabouts. Illustrations of such rapid accelerators are metallic dithiocarbamates, metallic salts of other thioacids, mercapto thiazoles and the like. According to the present invention this serious objection of prevulcanization may be entirely overcome, the rubber compounds may be mixed upon the mill with practically no danger of prevulcanization thereon, without sacrificing the accelerating power which is desired. Certain of the compounds forming the subject matter of the present invention may be mixed with entire safety on the mixing mills, subject to the conditions hereinafter named, whereas others may be safely mixed, observing certain precautions as to mill temperatures, etc.

The invention includes combining rubber and similar vulcanizable materials with a vulcanizing combination, including a vulcanizing agent, a metallic oxide or its equivalent and a 2-6 dinitro 4-chloro phenyl thiol derivative of a substituted dithiocarbamate, and vulcanizing the rubber. The invention also includes the products thus obtained, and the preparation of the chemical compounds as well.

The invention further consists in accelerating the action of the compounds by the addition of basic materials and in retarding the action of the compounds and particularly the burning of the compounds by the addition of acid materials. The invention further consists in introducing basic materials or acid materials or the compounds herein disclosed by diffusion from rubber or from any surrounding medium.

The whole compond, 2-6 dinitro 4-chloro phenyl dialkyl dithiocarbamate reacts at least as rapidly with sodium hydroxide in boiling aqueous alcohol as diphenylmethyl dimethyl dithiocarbamate reacts under the same conditions. All the compounds which react with sodium hydroxide at least as rapidly as diphenylmethyl dimethyl dithiocarbamate (M. P. 96.5-97° C.), accelerates vulcanization, in the presence of a metallic oxide, such as zinc oxide or an equivalent metallic compound. Those compounds which do not hydrolyze at such a rate do not accelerate vulcanization.

Zinc oxide is a good illustration of a metallic oxide which may be used. In place of zinc the following elements may be used in combined form, preferably somewhat basic and soluble in rubber; mercury preferably in the mercuric state, lead preferably in the plumbous state, cadmium, copper, preferably in the cupric state, arsenic preferably in the arsenous state, manganese preferably in the manganous state. Preferably the metallic compound is of such a nature that the metallic element is available during the vulcanization process. Oxides, stearates, carbonates are among the metallic compounds which may be used.

As one illustration of the invention, 100 parts of pale crepe, 10 parts of zinc oxide, 3 parts of sulphur, and 0.3 part of 2-6 dinitro 4 chloro phenyl dimethyl dithio carbamate may be mixed together in the customary way on a mixing mill or in any other desired manner. The rubber stock thus prepared is well vulcanized in 60 minutes at 20 lbs. steam pressure. The stock may also be vulcanized at higher steam pressures than 20 lbs.

2-6 dinitro 4-chloro phenyl dimethyl dithiocarbamate is a new compound. One method of preparing it is as follows:

45 grams of dimethylamine are dissolved in 1000 cc. of alcohol and to this solution are added 76 grams of carbon disulphide. To this mixture are then added 40 grams of caustic soda dissolved in a small amount of water, the whole mixture being kept cool throughout. The result is an alcoholic solution of sodium dimethyl dithiocarbamate. To this mixture are then added 237 grams of 2-6 dinitro 1, 4 dichlorobenzol and the whole heated to 50–60° C. for ¾ of an hour. The reaction mixture is then cooled and the product which is the 2-6 dinitro 4 chlorophenyl dimethyl dithiocarbamate crystallizes out. It is filtered from the alcohol, washed free from sodium chloride and dried.

The corresponding diethyl dithiocarbamate, etc., may be similarly prepared. In these compounds, one nitro group is ortho to the CS bond of the compound, and at least one of the remaining substituents, for example, the other nitro group, is meta to the aforesaid nitro group.

2-6 dinitro 4-chloro phenyl dimethyl dithiocarbamate functions well when the cure is carried out according to any of the commercial methods, such as in steam, talc, water, etc. Other dialkyl dithiocarbamates may be employed, provided they satisfy the conditions of hydrolysis herein set forth.

I have observed that the action of the compounds disclosed herein is particularly accelerated by the presence of a small amount of a basic material such as sodium hydroxide, trisodium phosphate, dicyandiamide, piperidine, aniline, dibenzylamine, piperazinehydrate, triethanolamine. The use of the base lowers the temperature at which the accelerator functions or increases its speed of functioning and usually increases the tensile strength at all temperatures of vulcanization by about 10%.

The base may be employed in amounts generally less than 1% or thereabouts.

Since a basic material accelerates the action of the accelerator and lowers the temperature at which it functions, it also increases the speed of burning on the mixing mill. Therefore the greater the amount of base present in the mix, the greater the danger of burning on the mixing mill and rubbers which are basic therefore accelerate the action of these compounds. Burning on the mixing mill is one form of what is herein called premature vulcanization. The latter expression also includes the burning, scorching, or setting up of the stock on mills, calenders, tubing machines, as well as any prevulcanization which may occur or be incipient prior to the actual deliberate vulcanization operation. This is particularly true of the dinitrophenyl compounds.

On the other hand the addition of acid retards the action of the accelerator and therefore improves its resistance to burning.

For example .1 part of monochlor acetic acid added to the above stock minimizes any danger of burning on the mill, but at the same time does retard the rate of vulcanization. With larger amounts of acid it is possible to retard vulcanization almost to the point where no vulcanization takes place. Other acids which I have successfully employed are sulphanilic, oxalic, picric, phosphoric, trichloracetic, para toluene sulphonyl chloride and pine tar. I have also successfully employed substances which may form acids during the course of vulcanization such as ethyl oxalate, or zinc acetate.

Mixes which are slightly acid because of the presence of carbon black or pine tar resist burning on the mill abnormally well. The vulcanization of rubbers which are acid by nature, or contain appreciable amounts of acid or acidic ingredients is not accelerated by the herein described compounds, unless the acidic properties be first removed or neutralized.

Likewise, rubbers or rubber stocks which are appreciably basic by nature, or contain basic materials, may display a marked, often undesirable tendency towards prevulcanization. Such basic rubbers or stocks may be treated with acidic material to remove, to curb, or to control this tendency to prevulcanize. Therefore, by the use of basic material and acidic material in suitable proportions as required, any rubber or stock may be brought to a predetermined speed of vulcanization.

Instead of adding on the mixing roll the basic materials intended to activate the compounds or accelerate their action, one may permit the basic material to diffuse into the rubber. For instance if the stock given above for vulcanization in the air be vulcanized in air containing ammonia, the vulcanization is greatly accelerated and the surface of the stock is remarkably hard and resistant to marring. The introduction of the basic material may be made on the mill by diffusion from a liquid, solution, or gas, or from adjoining rubber stock or from a fabric.

For example a stock containing 100 parts of pale crepe, 10 parts of zinc oxide, 3 parts of sulphur and .3 part of 2-6 dinitro-4-chlorophenyl dimethyl dithiocarbamate, made up in the usual manner, may be sheeted to say .060 inches thickness or may be in the form of an article. If the sheet or article be treated with gaseous ammonia for about 16 hrs., it will vulcanize very much more rapidly and at a lower temperature than a stock not so treated. Instead of gaseous ammonia, I may employ aqueous ammonia, aqueous diethylamine, aqueous aniline or dimethylamine or aniline vapor. It is believed that these basic materials diffuse into the rubber and accelerate the action of the 2-6 dinitro-4-chloro phenyl dimethyl dithiocarbamate.

As an example of the introduction by diffusion of the basic material as well as the introduction by diffusion of some of the compounds disclosed herein, the following illustration is given: 100 parts of pale crepe, 10 parts of zinc oxide, 3 parts of sulphur, 1 part of 2-6 dinitro-4-chlorophenyl dimethyl dithiocarbamate and .2 part of monochlor acetic acid are mixed to form one stock which is calendered to a thickness of .010″. Another stock is made up of 100 parts of pale crepe, 10 parts of zinc oxide, 3 parts of sulphur and 4 parts of dibenzylamine. This stock is mixed on the mills in the usual manner and calendered to a thickness of .010″. The two stocks are plied up alternately using 3 plies of each and allowed to stand for 24 hours to permit the diffusion of the dibenzylamine into the 2-6 dinitro-4-chloro phenyl stock and of the 2-6 dinitro-4-chloro phenyl dimethyl dithiocarbamate into the dibenzylamine stock. Thereafter the plied up stock is heated at 212° and it is found that vulcanization occurs much more quickly than it does for the individual stocks which have not been plied up. It will be observed that the dibenzylamine acts to neutralize the monochlor acetic acid as well as to activate the 2-6 dinitro-4-chloro phenyl dimethyl dithiocarbamate.

As pointed out before the presence of the monchloracetic acid improved the resistance to burning but the procedure may be carried out without the use of the acid.

The basic material (ammonia etc.) may be introduced from the surrounding medium such as air or water to neutralize the acids and/or to activate the accelerator. For instance if .2 part of acid be added to the stock for air cure given above, and the stock be cured in air containing ammonia gas the ammonia will not only neutralize the acid but will activate the 2-6 dinitro-4-chloro phenyl compound. The basic material may be introduced in any desired manner at any time prior to complete vulcanization, i. e., it may be introduced during vulcanization as a gas or vapor, or it may be applied to the stock by painting, dipping, or blending in cement form, etc. before the stock is subjected to vulcanization, or the stock may be vulcanized in a solution or suspension of the basic material.

Any of these ingredients, base, acid, and accelerator may be brought together in the form of cements, i. e. a cement containing accelerator may be mixed with a cement containing the base at the time the cement is to be used. The accelerator cement will not vulcanize appreciably at ordinary temperatures if the base be absent. Likewise, as accelerator-containing cement may be preserved in an unvulcanized condition for a long period by the addition of acid (as such, in solution, or in a cement). When vulcanization is desired, a base may be added (as such, in solution, or in a cement) and vulcanization will then take place.

The compounds in general may be used in amounts varying between ½ and 1 part on 100 parts of rubber, depending of course on the type of stock, etc.

It is believed that, in general, as the molecular weight of the groups attached to the nitrogen is increased the higher is the vulcanizing temperature, when equi-molecular amounts of accelerator are considered, and the more resistant are the compounds to prevulcanization on the mixing mills, and the better is their action with litharge in the absence or presence of zinc oxide.

All of the above mentioned compounds are accelerators of vulcanization. Some of them give high tensile strength and other valuable physical properties such as improved resistance to abrasion, ageing, and other properties. The claims are therefore to be broadly interpreted as including such treatment of rubber in any form (solid, solution, dispersion) for these purposes as well as for vulcanization, in which latter instance, it is understood that a vulcanizing agent and a metallic oxide or its equivalent will be added to the rubber and an antioxidant or other material improving the physical properties of the rubber may be present if desired. It is of course understood that not all of these compounds are of equal accelerating strength, pound for pound, under identical vulcanizing conditions. These accelerators may be used in conjunction with any of the known antioxidants, age improvers, and other materials introduced into rubber to improve ageing and other physical properties.

The rate of reaction of the compound with sodium hydroxide in boiling aqueous alcohol may be determined as follows: .00125 moles of the compound is weighed into a 50 cc. Erlenmeyer; 25 cc. 95% alcohol and .00125 moles sodium hydroxide in the form of an approximately normal solution are added and the solution brought to the boiling point as quickly as possible and kept there for exactly 30 minutes. The solution is then cooled quickly and titrated with approximately N/10 acid, using phenolphthalen as the indicator. Carbon dioxide-free water should be used throughout. A blank should be run in order to check up on the amount of acid necessary to neutralize the sodium hydroxide when no compound is used. The decrease in hydroxyl ion content during the boiling is taken as a measure of the extent of the reaction with sodium hydroxide.

The above procedure constitutes a method whereby the relative rate of hydrolysis of any given compound of the types disclosed may be compared with that of diphenylmethyl dimethyl dithiocarbamate.

The diphenylmethyl dimethyl dithiocarbamate may be prepared in accordance with the general procedure indicated herein for the related esters of dithiocarbamates, that is, reacting in dilute alcoholic solution under heat the sodium salt,—sodium dimethyl dithiocarbamate—and the chloride of the ester group,—diphenyl chloro methane. The separated oil solidifies on standing and may be purified by recrystallization from alcohol in the usual manner.

It is known that the rate of hydrolysis of organic compounds, or more exactly, their rate of reaction with a base such as sodium hydroxide, varies with the substituents in the organic compound. This variation has been utilized in the present invention.

Having thus described my invention, what I claim and desire to protect by Letters Patent is:

1. A rubber product derived from rubber combined with a metallic oxide, a vulcanizing agent and a 2-6 dinitro 4 chloro phenyl ester of a substituted dithiocarbamic acid, which ester is capable of hydrolyzing in aqueous alcohol in the presence of sodium hydroxide at least as rapidly as diphenyl methyl dimethyl dithiocarbamate under the same conditions.

2. A vulcanized rubber product derived from rubber combined with zinc oxide, sulphur and a 2-6 dinitro 4 chloro phenyl ester of an alkyl dithiocarbamic acid, which ester is capable of hydrolyzing in aqueous alcohol in the presence of sodium hydroxide at least as rapidly as diphenyl methyl dimethyl dithiocarbamate under the same conditions.

3. A vulcanized rubber product derived from rubber combined with zinc oxide, sulphur and a 2-6 dinitro 4 chloro phenyl ester of a dialkyl dithiocarbamic acid.

4. A vulcanized rubber product derived from rubber combined with zinc oxide, sulphur and a 2-6 dinitro 4 chloro phenyl ester of a disubstituted dithiocarbamic acid.

5. A vulcanized rubber product derived from rubber combined with zinc oxide, sulphur and a 2-6 dinitro 4 chloro phenyl ester of an aliphatic substituted dithiocarbamic acid.

6. A vulcanized rubber product derived from rubber combined with zinc oxide, sulphur and 2-6 dinitro 4 chloro phenyl dimethyl dithiocarbamate.

7. A method of treating rubber which comprises vulcanizing rubber containing a metallic oxide and a vulcanizing agent in the presence of a 2-6 dinitro 4 chloro phenyl ester of a substituted dithiocarbamic acid which ester is capable of hydrolyzing in aqueous alcohol in the presence of sodium hydroxide at least as rapidly as diphenyl methyl dimethyl dithiocarbamate under the same conditions.

8. A method of treating rubber which comprises vulcanizing rubber containing zinc oxide and sulphur in the presence of a 2-6 dinitro 4 chloro phenyl ester of an alkyl dithiocarbamic acid, which ester is capable of hydrolyzing aqueous alcohol in the presence of sodium hydroxide at least as rapidly as diphenyl methyl dimethyl dithiocarbamate under the same conditions.

9. A method of treating rubber which comprises vulcanizing rubber containing zinc oxide and sulphur in the presence of a 2-6 dinitro 4 chloro phenyl ester of a dialkyl dithiocarbamic acid.

10. A method of treating rubber which comprises vulcanizing rubber containing zinc oxide and sulphur in the presence of a 2-6 dinitro 4 chloro phenyl ester of a dissubstituted dithiocarbamic acid.

11. A method of treating rubber which comprises vulcanizing rubber containing zinc oxide and sulphur in the presence of 2-6 dinitro 4 chloro phenyl dimethyl dithiocarbamate.

12. A method of treating rubber which comprises vulcanizing rubber containing zinc oxide and sulphur in the presence of a 2-6 dinitro 4 chloro phenyl ester of an aliphatic substituted dithiocarbamic acid.

Signed at New York, county and State of New York, this 23rd day of February, 1928.

SIDNEY M. CADWELL.